United States Patent
Li et al.

(10) Patent No.: US 10,367,658 B2
(45) Date of Patent: Jul. 30, 2019

(54) WIRELESS NETWORK SESSION ESTABLISHMENT METHOD AND APPARATUS UTILIZING A VIRTUAL LOCAL AREA NETWORK LABEL

(71) Applicant: Huawei Technologies Co., Ltd., Shenzhen (CN)

(72) Inventors: Yan Li, Beijing (CN); Xiaoyan Shi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 695 days.

(21) Appl. No.: 14/565,036

(22) Filed: Dec. 9, 2014

(65) Prior Publication Data

US 2015/0092786 A1  Apr. 2, 2015

Related U.S. Application Data

(63) Continuation of application No. PCT/CN2012/077666, filed on Jun. 27, 2012.

(51) Int. Cl.
 *H04L 12/46* (2006.01)
 *H04W 72/12* (2009.01)
 (Continued)

(52) U.S. Cl.
 CPC ...... *H04L 12/4654* (2013.01); *H04L 12/2858* (2013.01); *H04L 29/06319* (2013.01);
 (Continued)

(58) Field of Classification Search
 CPC ..... H04N 21/4437; H04Q 2213/13399; H04Q 11/0005; H04L 12/465; H04L 12/4675;
 (Continued)

(56) References Cited

U.S. PATENT DOCUMENTS

| 8,165,156 B1 | 4/2012 | Melsen |
| 8,711,872 B2 | 4/2014 | Okada et al. |
| 2004/0114592 A1* | 6/2004 | Kang ................ H04Q 11/0067 370/389 |
| 2004/0172480 A1 | 9/2004 | Hirose et al. |

(Continued)

FOREIGN PATENT DOCUMENTS

| CN | 1357997 A | 7/2002 |
| CN | 101075962 A | 11/2007 |

(Continued)

OTHER PUBLICATIONS

"IEEE Standard for Local and Metropolitan Area Networks; Port-Based Network Access Control," IEEE Std 802.1X, pp. i-205, Institute of Electrical and Electronics Engineers, New York, New York (Feb. 5, 2010).

*Primary Examiner* — Salvador E Rivas
(74) *Attorney, Agent, or Firm* — Leydig, Voit & Mayer, Ltd.

(57) ABSTRACT

The present invention is applicable to the field of communications and provides a session establishment method and apparatus. The method includes: acquiring an infrastructure virtual circuit IVC corresponding to a user equipment UE; sending a virtual local area network VLAN label corresponding to the IVC to a customer location function set, so that the customer location function set adds the VLAN label to a packet of the UE, where the VLAN label is configured by an L2 session control functional entity for the IVC; and notifying an L2 forwarding functional entity of the VLAN label, so that the L2 forwarding functional entity forwards, to the IVC, the packet sent by the customer location function set and added with the VLAN label. In the present invention, a case in which the L2 forwarding functional entity needs to store a large MAC table is avoided, and packet forwarding efficiency is improved.

15 Claims, 6 Drawing Sheets

(51) Int. Cl.
*H04L 29/06* (2006.01)
*H04L 12/28* (2006.01)
*H04W 76/12* (2018.01)
*H04W 76/10* (2018.01)
*H04W 72/04* (2009.01)
*H04W 76/11* (2018.01)

(52) U.S. Cl.
CPC ....... *H04W 72/1257* (2013.01); *H04W 76/10* (2018.02); *H04W 76/12* (2018.02); *H04L 29/06755* (2013.01); *H04W 72/0493* (2013.01); *H04W 76/11* (2018.02)

(58) Field of Classification Search
CPC ... H04L 49/354; H04L 49/25; H04L 12/4654; H04L 12/1407; H04L 45/70; H04J 14/0245; H04J 14/0249; H04W 72/1257; H04W 72/0493
See application file for complete search history.

(56) References Cited

U.S. PATENT DOCUMENTS

| | | | |
|---|---|---|---|
| 2006/0187855 A1* | 8/2006 | Booth, III | H04L 41/0253 370/254 |
| 2007/0171918 A1 | 7/2007 | Ota et al. | |
| 2008/0117902 A1 | 5/2008 | Vinneras | |
| 2009/0154466 A1* | 6/2009 | Townsley | H04L 69/168 370/395.1 |
| 2009/0205024 A1 | 8/2009 | Kokot et al. | |
| 2010/0257589 A1* | 10/2010 | Zhao | H04W 76/38 726/3 |
| 2011/0235644 A1 | 9/2011 | Porat | |
| 2012/0327947 A1* | 12/2012 | Cai | H04W 8/18 370/410 |

FOREIGN PATENT DOCUMENTS

| | | |
|---|---|---|
| CN | 101098280 A | 1/2008 |
| CN | 101252587 A | 8/2008 |
| CN | 101409672 A | 4/2009 |

\* cited by examiner

WIRELESS NETWORK SESSION ESTABLISHMENT METHOD AND APPARATUS UTILIZING A VIRTUAL LOCAL AREA NETWORK LABEL

CROSS-REFERENCE TO RELATED APPLICATIONS

This application is a continuation of International Patent Application No. PCT/CN2012/077666, filed on Jun. 27, 2012, which is hereby incorporated by reference in its entirety.

TECHNICAL FIELD

The present invention relates to the field of communications, and in particular, to a session establishment method and apparatus.

BACKGROUND

The Broadband-Forum (BBF) standards organization defines a dynamic L2 session establishment method in a WT145 standard; however, in the solution, when multiple mobile devices supporting wireless local area network (WLAN) access move to a same customer location function set and request access, the customer location function set cannot configure a (service VLAN, SVLAN) label/(customer VLAN, CVLAN) label for each mobile device; and therefore, the solution described in the foregoing cannot solve a problem that multiple mobile devices access simultaneously.

To solve the problem described in the foregoing, in the prior art, a customer location function set directly forwards an L2 packet including a medium access control (MAC) layer address of a mobile device; after receiving a new MAC address packet, an L2 forwarding functional entity triggers an L2 session control functional entity to acquire a routing policy, and forwards the packet including the MAC address to a pre-established infrastructure virtual circuit (IVC) according to the policy. However, in the method described in the foregoing, the L2 forwarding functional entity needs to store a MAC address of each user, which causes that a MAC table is excessively large, thereby increasing time for searching a MAC address and reducing packet forwarding efficiency.

SUMMARY

An objective of embodiments of the present invention is to provide a session establishment method, so as to solve a problem that an existing session establishment method causes that a MAC table stored in an L2 forwarding functional entity is excessively large and packet forwarding efficiency is reduced.

The embodiments of the present invention are implemented as follows: A session establishment method includes:

acquiring an infrastructure virtual circuit IVC corresponding to a user equipment UE;

sending a virtual local area network VLAN label corresponding to the IVC to a customer location function set, so that the customer location function set adds the VLAN label to a packet of the UE, where the VLAN label is configured by an L2 session control functional entity for the IVC; and notifying an L2 forwarding functional entity of the VLAN label, so that the L2 forwarding functional entity forwards, to the IVC, the packet sent by the customer location function set and added with the VLAN label.

Another objective of the embodiments of the present invention is to provide a session establishment method, including:

sending an authentication request including a subscriber identity of a user equipment UE, so that an L2 session control functional entity acquires an infrastructure virtual circuit IVC corresponding to the UE, where the IVC is determined according to the subscriber identity;

adding a virtual local area network VLAN label to a packet of the UE, where the VLAN label is configured by the L2 session control functional entity for the IVC and sent to a customer location function set; and sending the packet added with the VLAN label to an L2 session forwarding functional entity, so that the L2 session forwarding functional entity forwards the packet added with the VLAN label to the IVC.

Another objective of the embodiments of the present invention is to provide a session establishment method, including:

receiving a virtual local area network VLAN label that is sent by an L2 session control functional entity and corresponds to an infrastructure virtual circuit IVC, where the IVC is an IVC corresponding to a user equipment UE, and the VLAN label is configured by the L2 session control functional entity for the IVC;

receiving a packet sent by a customer location function set and added with the VLAN label; and forwarding the packet to the IVC corresponding to the VLAN label.

Another objective of the embodiments of the present invention is to provide a session establishment apparatus, including:

an IVC acquiring unit, configured to acquire an infrastructure virtual circuit IVC corresponding to a user equipment UE;

a VLAN label sending unit, configured to send a virtual local area network VLAN label corresponding to the IVC to a customer location function set, so that the customer location function set adds the VLAN label to a packet of the UE, where the VLAN label is configured by an L2 session control functional entity for the IVC; and a VLAN label notifying unit, configured to notify an L2 forwarding functional entity of the VLAN label, so that the L2 forwarding functional entity forwards, to the IVC, the packet sent by the customer location function set and added with the VLAN label.

Another objective of the embodiments of the present invention is to provide a session establishment apparatus, including:

an authentication request sending unit, configured to send an authentication request including a subscriber identity of a user equipment UE, so that an L2 session control functional entity acquires an infrastructure virtual circuit IVC corresponding to the UE, where the IVC is determined according to the subscriber identity;

a VLAN label adding unit, configured to add a VLAN label to a packet of the UE, where the VLAN label is configured by the L2 session control functional entity for the IVC and sent to a customer location function set; and a packet sending unit, configured to send the packet added with the VLAN label to an L2 session forwarding functional entity, so that the L2 session forwarding functional entity forwards the packet added with the VLAN label to the IVC.

Another objective of the embodiments of the present invention is to provide a session establishment apparatus, including:

a VLAN label receiving unit, configured to receive a VLAN label that is sent by an L2 session control functional entity and corresponds to an infrastructure virtual circuit IVC, where the IVC is an IVC corresponding to a user equipment UE, and the VLAN label is configured by the L2 session control functional entity for the IVC;

a packet receiving unit, configured to receive a packet sent by a customer location function set and added with the VLAN label; and a packet forwarding unit, configured to forward the packet to the IVC corresponding to the VLAN label.

In the embodiments of the present invention, an L2 session control functional entity configures a corresponding VLAN label for an IVC, and binds, trough a routing policy, a UE with a VLAN label of an IVC corresponding to the UE, so that an L2 forwarding functional entity can forward, according to the binding relationship, a packet of the UE to the IVC corresponding to the UE, so as to implement dynamic establishment of an L2 session, thereby avoiding a case in which the L2 forwarding functional entity needs to store a large MAC table and improving packet forwarding efficiency.

DESCRIPTION OF EMBODIMENTS

In order to make the objectives, technical solutions, and advantages of the present invention more comprehensible, the present invention is described in further detail in the following with reference to the accompanying drawings and embodiments. It should be understood that, the specific embodiments described herein are merely used to explain the present invention, but are not intended to limit the present invention.

In embodiments of the present invention, an L2 session control functional entity configures a corresponding VLAN label for an IVC, and binds, trough a routing policy, a UE with a VLAN label of an IVC corresponding to the UE, so that an L2 forwarding functional entity can forward, according to the binding relationship, a packet of the UE to the IVC corresponding to the UE, so as to implement dynamic establishment of an L2 session, thereby avoiding a case in which the L2 forwarding functional entity needs to store a large MAC table and improving packet forwarding efficiency.

A session establishment method provided in the embodiments of the present invention is based on a system structure that is applicable to an L2 session establishment method and is defined by the BBF standards organization in a WT145 standard; the system structure relates to functional entities, such as a customer location function set, an L2 forwarding functional entity, and an L2 session control functional entity, and details of a specific system structure defined in the WT145 standard are not described herein.

Figure 1:
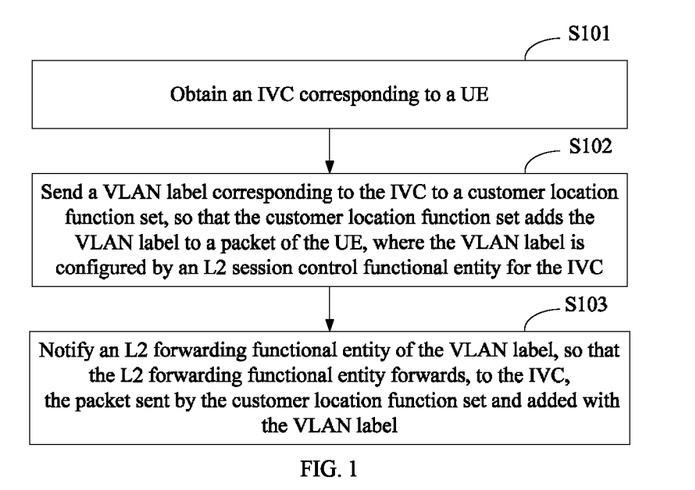
FIG. 1 is a flow chart of implementing a session establishment method by an L2 session control functional entity according to an embodiment of the present invention.

FIG. 1 shows an implementing procedure of a session establishment method according to an embodiment of the present invention. In this embodiment, an executor of the procedure is an L2 session control functional entity. A specific procedure of the session establishment method is as follows:

In step S101, obtain an IVC corresponding to a UE.

The IVC corresponding to the UE is determined by a corresponding policy control system according to a subscriber identity of the UE, where the policy control system may be a broadband policy control framework (BPCF) or a policy and charging control (PCC) architecture, and the subscriber identity may be a user name, a telephone number, an international mobile subscriber identity (IMSI) of a subscriber of the UE, which are not limited herein. The policy control system determines a network service provider NSP of the UE according to the subscriber identity of the UE, so as to return a corresponding routing policy, where the routing policy indicates the IVC corresponding to the UE, and the IVC is an IVC used for forwarding a packet of the UE. In the routing policy, the IVC corresponding to the UE is indicated by specifying a network IP edge device connected to the IVC and a unique identity of the IVC in the edge device; and when one edge device is connected to only one IVC, the routing policy may specify only the edge device connected to the IVC. In addition, the routing policy further includes a quality of service (QoS) policy corresponding to the UE.

As an embodiment of the present invention, after receiving an authentication request that is sent by a customer location function set and includes the subscriber identity of the UE, the L2 session control functional entity sends an access request to the corresponding policy control system according to the authentication request, so that the policy control system returns a corresponding routing policy to the L2 session control functional entity according to the subscriber identity of the UE included in the access request.

As another embodiment of the present invention, the customer location function set directly sends an authentication request including the subscriber identity of the UE to the corresponding policy control system, so that the policy control system returns a corresponding routing policy to the L2 session control functional entity according to the authentication request, so as to indicate the IVC corresponding to the UE.

In this embodiment, the L2 session control functional entity does not know access of the UE during a process of determining a routing policy; and therefore, the routing policy returned by the policy control system needs to include the subscriber identity of the UE, so that the L2 session control functional entity establishes a forwarding relationship between the UE and the IVC corresponding to the UE.

In this embodiment, the L2 session control functional entity acquires, from the routing policy returned by the corresponding policy control system, the IVC corresponding to the UE that currently requests access.

In step S102, send a VLAN label corresponding to the IVC to the customer location function set, so that the customer location function set adds the VLAN label to a packet of the UE, where the VLAN label is configured by the L2 session control functional entity for the IVC.

In this embodiment, the L2 session control functional entity configures a corresponding VLAN label for each IVC, where the configured VLAN label may be a service virtual local area network (SVLAN) label or a customer virtual local area network (CVLAN) label or a combination of an SVLAN label and a CVLAN label.

As an embodiment of the present invention, the L2 session control functional entity may establish at least one IVC in advance before step S101, and configure a corresponding VLAN label for each IVC.

As another embodiment of the present invention, after acquiring the routing policy of the UE, the L2 session control functional entity may establish the IVC in real time according to the IVC that is included in the routing policy and corresponds to the UE, and at the same time, allocate a corresponding VLAN label for the established IVC.

In step S103, notify an L2 forwarding functional entity of the VLAN label, so that the L2 forwarding functional entity forwards, to the IVC, the packet sent by the customer location function set and added with the VLAN label.

In this embodiment, the customer location function set binds the VLAN label with a MAC address of the UE after acquiring the VLAN label, adds the VLAN label in the packet sent by the UE after receiving the packet of the UE, and forwards the packet added with the VLAN label to the L2 session forwarding functional entity. Because the L2 session control functional entity notifies, in advance, the L2 session forwarding functional entity of the IVC and the VLAN label corresponding to the IVC, at this time, the L2 session forwarding functional entity may directly forward, according to the VLAN label in the packet, the packet to the IVC corresponding to the VLAN label.

In this embodiment, in a case in which the L2 session control functional entity establishes several IVCs in advance before step S101 and configures a corresponding VLAN label for each IVC, the L2 session control functional entity may generate a relationship table by configuring the VLAN label for each IVC, and notify the L2 forwarding functional entity of the relationship table, where the relationship table is used to indicate the VLAN label corresponding to each IVC. After acquiring the packet sent by the customer location function set, the L2 forwarding functional entity may forward, according to the VLAN label added in the packet, the packet to the IVC corresponding to the VLAN label.

In this way, in this embodiment, the L2 session forwarding functional entity does not need to maintain a large MAC table but only need to maintain a relationship between each IVC and the VLAN label corresponding to the IVC, to complete establishment of an L2 session and forward the packet of the UE to the corresponding IVC. Meanwhile, with the session establishment method provided in this embodiment, that multiple UEs share one VLAN label can also be implemented, so that the multiple UEs can access simultaneously, thereby implementing a dynamic session establishment process.

Figure 2:
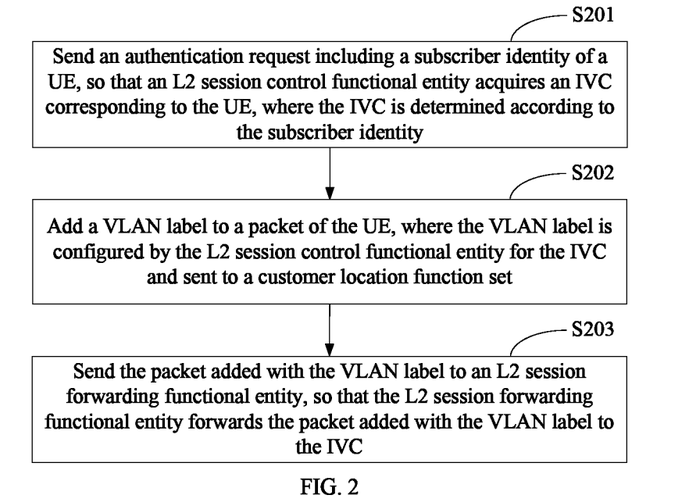
FIG. 2 is a flow chart of implementing a session establishment method by a customer location function set according to an embodiment of the present invention.

FIG. 2 shows a procedure of implementing a session establishment method according to an embodiment of the present invention. In this embodiment, an executor of the procedure is a customer location function set. A specific procedure of the session establishment method is as follows:

In step S201, send an authentication request including a subscriber identity of a user equipment, so that an L2 session control functional entity acquires an IVC corresponding to the UE, where the IVC is determined according to the subscriber identity.

As an embodiment of the present invention, the customer location function set may send the authentication request to the L2 session control functional entity, so that the L2 session control functional entity sends an access request to a corresponding policy control system according to the authentication request, and the policy control system returns a corresponding routing policy to the L2 session control functional entity according to the subscriber identity of the UE included in the access request, and the L2 session control functional entity acquires the IVC corresponding to the UE.

As another embodiment of the present invention, the customer location function set may send the authentication request to a corresponding policy control system, so that the policy control system returns a corresponding routing policy to the L2 session control functional entity according to the subscriber identity of the UE in the authentication request, and the L2 session control functional entity acquires the IVC corresponding to the UE.

In step S202, add a VLAN label to a packet of the UE, where the VLAN label is configured by the L2 session control functional entity for the IVC and sent to the customer location function set.

In this embodiment, when sending an L2 packet of the UE, the customer location function set adds a VLAN label associated with a MAC address to the packet according to the MAC address in the packet, where the VLAN label is configured by the L2 session control functional entity for the IVC corresponding to the UE and sent to the customer location function set; after receiving the VLAN label, the customer location function set associates the VLAN label with the MAC address of the UE; and after that, each time when a packet comes from the UE, an associated VLAN label is added to the packet according to a MAC address in the packet.

In step S203, send the packet added with the VLAN label to an L2 session forwarding functional entity, so that the L2 session forwarding functional entity forwards the packet added with the VLAN label to the IVC.

Because an implementation principle of the foregoing steps of this embodiment is the same as that of the embodiment shown in FIG. 1, details are not described herein.

In this embodiment, the customer location function set only needs to maintain an association relationship between a MAC address of each UE and a VLAN label corresponding to each UE; and each time when a packet comes from the UE, the customer location function set adds, according to a MAC address in the packet, a VLAN label to the packet and sends the packet to the L2 session forwarding functional entity, and the L2 session forwarding functional entity may forward the packet of the UE to the corresponding IVC, so as to implement establishment of an L2 session.

Figure 3:
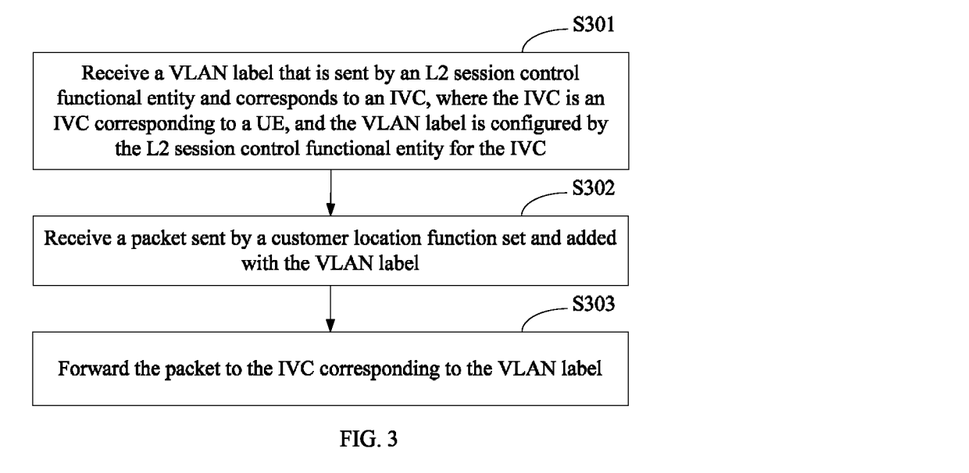
FIG. 3 is a flow chart of implementing a session establishment method by an L2 session forwarding functional entity according to an embodiment of the present invention.

FIG. 3 shows a procedure of implementing a session establishment method according to an embodiment of the present invention. In this embodiment, an executor of the procedure is an L2 session forwarding functional entity. A specific procedure of the session establishment method is as follows:

In step S301, receive a VLAN label that is sent by an L2 session control functional entity and corresponds to an IVC, where the IVC is an IVC corresponding to a UE, and the VLAN label is configured by the L2 session control functional entity for the IVC.

In step S302, receive a packet sent by a customer location function set and added with the VLAN label.

In step S303, forward the packet to the IVC corresponding to the VLAN label.

In this embodiment, after receiving the VLAN label that is sent by the L2 session control functional entity and corresponds to the IVC, the L2 session forwarding functional entity establishes, at a local side, a forwarding relationship between the IVC and the VLAN label corresponding to the IVC; and subsequently, when receiving a packet from the customer location function set, the L2 session forwarding functional entity forwards, according to a VLAN label added in the packet, the packet to an IVC having a forwarding relationship with the VLAN label.

In this embodiment, in a case in which the L2 session control functional entity establishes several IVCs in advance earlier and configures a corresponding VLAN label for each IVC, the L2 session control functional entity may generate a relationship table by configuring the VLAN label for each IVC, and notify the L2 forwarding functional entity of the relationship table, where the relationship table is used to indicate the VLAN label corresponding to each IVC. After acquiring the packet sent by the customer location function set, the L2 forwarding functional entity may forward, according to the VLAN label added in the packet, the packet to the IVC corresponding to the VLAN label.

Because an implementation principle of the foregoing steps of this embodiment is the same as those of the embodiments shown in FIG. 1 and FIG. 2, details are not described herein.

In this embodiment, the L2 session forwarding functional entity only needs to maintain a forwarding relationship between the IVC and the VLAN label corresponding to the IVC to forward the packet of the UE to the corresponding IVC, so as to implement establishment of an L2 session, but does not need to maintain a large MAC table, thereby improving packet forwarding efficiency.

Several application scenarios of the embodiments shown in FIG. 2 to FIG. 3 are described in the following.

Figure 4:
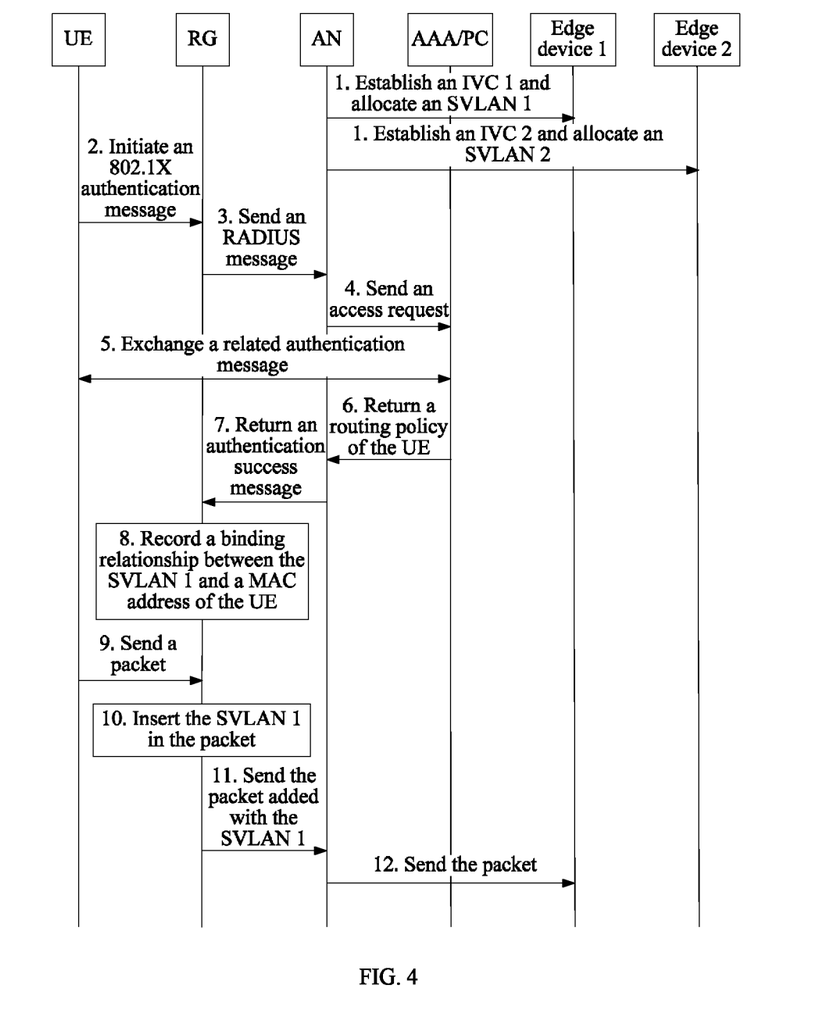
FIG. 4 is an interactive flow chart of a first scenario of a session establishment method according to an embodiment of the present invention.

FIG. 4 shows an interactive flow chart of a first scenario in which a session establishment method is operated according to an embodiment of the present invention. In this embodiment, a customer location function set is integrated in a residential gateway (RG), and both an L2 session control functional entity and an L2 session forwarding functional entity are integrated in an access node (AN) of a physical device, where the AN may be a digital subscriber line access multiplexer (DSLAM) for telephone line access or an optical line terminal (OLT) for optical access; and in addition, in this scenario, the RG is further integrated with functions of an access point (AP) and an access control (AC) in a WLAN network. An interactive procedure is described in detail in the following:

1. By using two NSPs as an example, an AN establishes an IVC 1 and an IVC 2 with an edge device 1 and an edge device 2 of the two NSPs in advance respectively, and allocates VLAN labels for the two IVCs, for example, allocates an SVLAN 1 for the IVC 1 and an SVLAN 2 for the IVC 2.

2. An UE initiates an 802.1X authentication message to an RG, where the UE is a terminal device supporting a WLAN.

3. The RG sends a remote authentication dial in user service (RADIUS) massage to the AN according to the 802.1X authentication message, and enables an extensible authentication protocol (EAP) to authenticate the UE, and at the same time, the RG records a MAC address of the UE.

4. As an authentication, authorization and accounting (AAA) functional entity agent, the AN node sends an access request to an authentication, authorization, and accounting/policy control functional entity.

5. The AAA/PC and the UE exchange a related authentication message.

6. After the authentication is completed, the AAA/PC returns a routing policy of the UE to the AN.

7. The AN determines, according to the routing policy, that a packet of the UE should be sent to the IVC 1, then determines a binding relationship between the UE and the SVLAN 1, and returns an authentication success message to the RG, where the message includes label information of the SVLAN 1.

8. The RG records a binding relationship between the SVLAN 1 and the MAC address of the UE.

9. The UE sends the packet to the RG.

10. The RG acquires the MAC address of the UE from the packet, and inserts, in the packet, the SVLAN 1 bound to the MAC address.

11. The RG sends the packet added with the SVLAN 1 to the AN.

12. The AN sends, according to the SVLAN 1 in the packet, the packet to the IVC 1 corresponding to the SVLAN 1.

Figure 5:
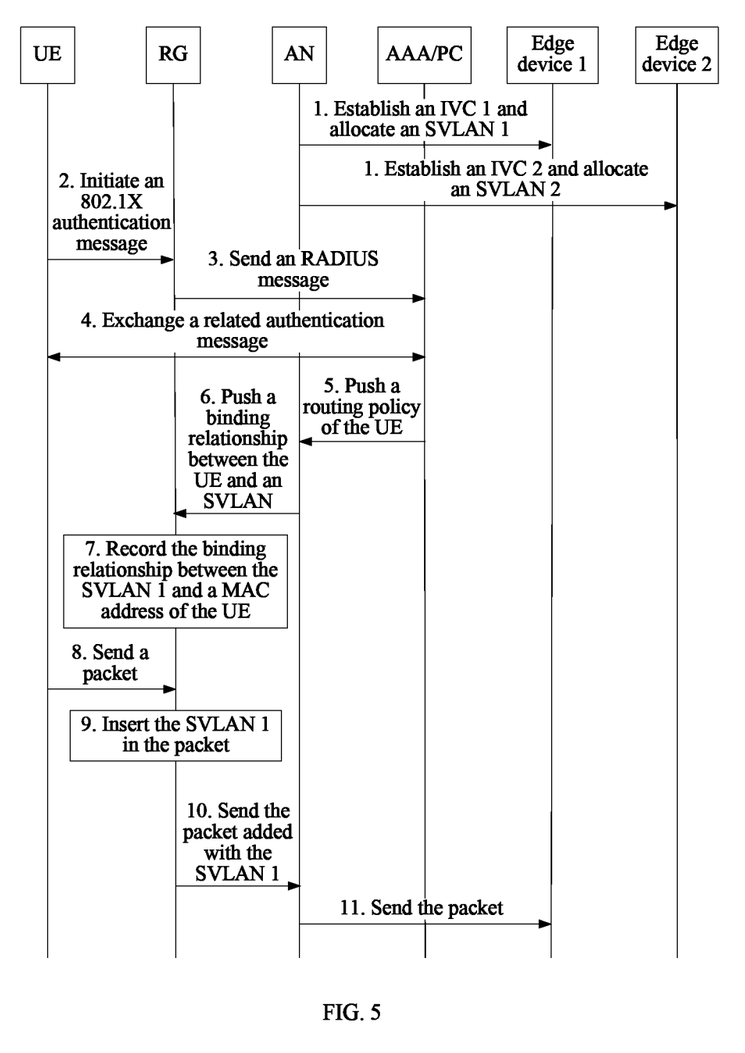
FIG. 5 is an interactive flow chart of a second scenario of a session establishment method according to an embodiment of the present invention.

FIG. 5 shows an interactive flow chart of a second scenario in which a session establishment method is operated according to an embodiment of the present invention. A difference from the scenario shown in FIG. 4 lies in that, an RG directly sends an authentication request to an AAA/PC; and steps 1 and 2 are the same as steps 1 and 2 in FIG. 4, and other parts of the procedure are described in detail in the following.

3. The RG sends an RADIUS message to the AAA/PC according to an 802.1X authentication message, and enables an EAP to authenticate the UE.

In the process described in the foregoing, access of the UE is unknown to the AN node.

4. The AAA/PC and the UE exchange a related authentication message.

5. After the authentication is completed, the AAA/PC returns a routing policy of the UE to the AN, where the routing policy further includes a subscriber identity of the user.

6. The AN determines, according to the routing policy, that a packet of the UE should be sent to an IVC 1, then determines a binding relationship between the UE and the SVLAN 1, and pushes the binding relationship between the UE and the SVLAN 1 to the RG by using a push message, where the push message includes the subscriber identity of the UE and label information of the corresponding SVLAN 1.

It should be noted that a protocol for pushing a message is not limited in the present invention, and the message may be an authorization change (Change of AuthorizationCoA) message in a RADIUS protocol, and may also be a port configuration message in an access node control protocol (ANCP).

7. The RG records a binding relationship between the SVLAN 1 and a MAC address of the UE.

8. The UE sends the packet to the RG.

9. The RG acquires the MAC address of the UE from the packet, and inserts, in the packet, the SVLAN 1 bound to the MAC address.

10. The RG sends the packet added with the SVLAN 1 to the AN.

11. The AN sends, according to the SVLAN 1 in the packet, the packet to the IVC 1 corresponding to the SVLAN 1.

Figure 6:
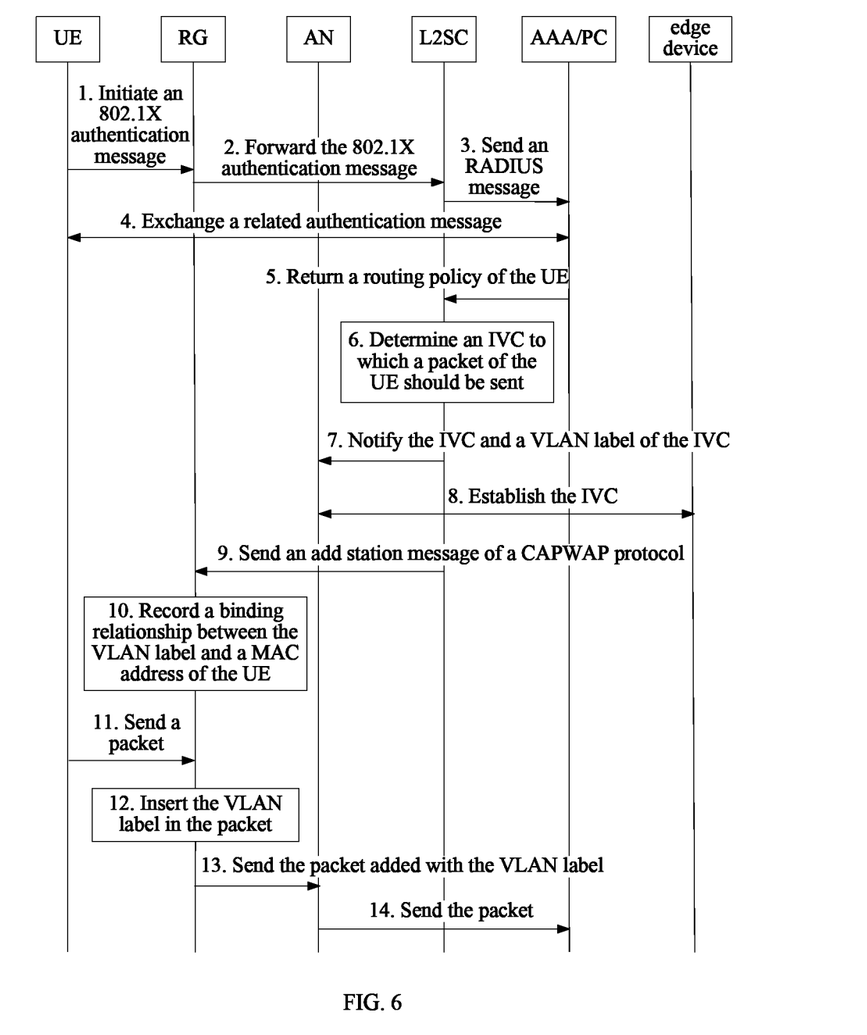
FIG. 6 is an interactive flow chart of a third scenario of a session establishment method according to an embodiment of the present invention.

FIG. 6 shows an interactive flow chart of a third scenario in which a session establishment method is operated according to an embodiment of the present invention. In this embodiment, a difference from the scenarios shown in FIG. 4 and FIG. 5 lies in that, an L2 session control functional entity is independently deployed and is integrated with an AC function in a WLAN network, and an RG is integrated with an AP function in the WLAN network; and in this embodiment, an IVC connection between an AN and an edge device is not established in advance but is dynamically established. Details are described in the following.

1. A UE initiates an 802.1X authentication message to an RG, where the UE is a terminal device supporting a WLAN.

2. Because the RG has only an AP function, the RG forwards the 802.1X authentication message to a level 2 session control (L2SC) functional entity through a configuration and provisioning for wireless access points (CAPWAP) tunnel according to the 802.1X authentication message.

3. The L2SC sends an RADIUS message to an AAA/PC.

4. The AAA/PC and the UE exchange a related authentication message.

5. After the authentication is completed, the AAA/PC returns a routing policy of the UE to the L2SC.

6. The L2SC determines, according to the routing policy, an IVC to which a packet of the UE should be sent.

7. The L2SC allocates a VLAN label for the IVC, and notifies an AN of the IVC and the VLAN label corresponding to the IVC.

8. The AN establishes an IVC connection from an edge device to the AN.

9. The L2SC sends an "add station" message of a CAPWAP protocol to the RG, where the message includes related information of the VLAN label.

10. The RG records a binding relationship between the VLAN label and a MAC address of the UE.

11. The UE sends the packet to the RG.

12. The RG acquires the MAC address of the UE from the packet, and inserts, in the packet, the VLAN label bound to the MAC address.

13. The RG sends the packet added with the VLAN label to the AN.

14. The AN sends, according to the VLAN label in the packet, the packet to the IVC corresponding to the VLAN label.

Figure 7:
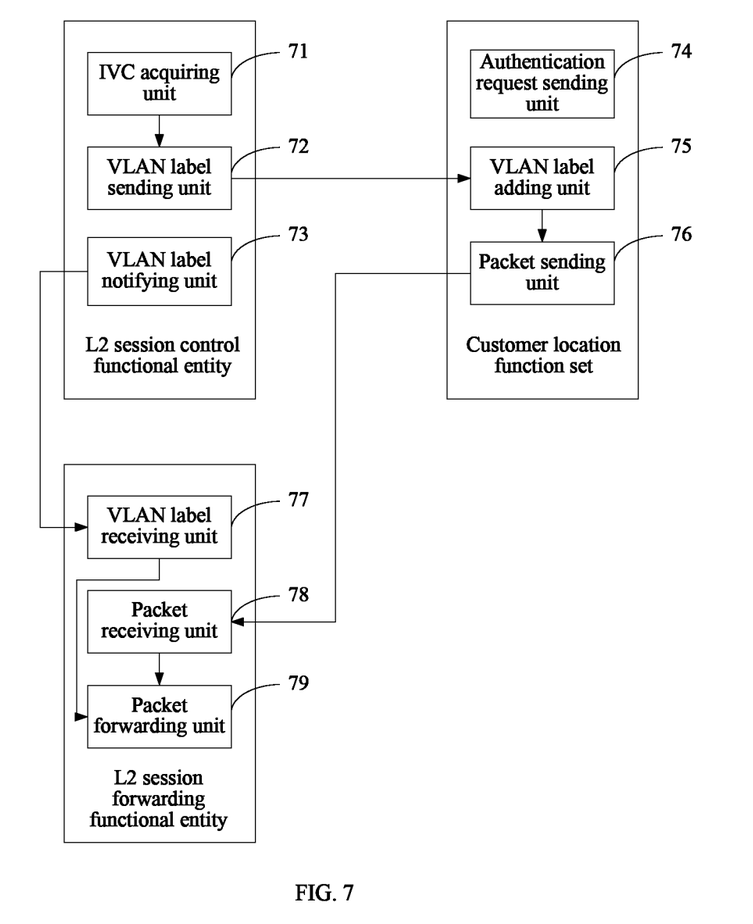
FIG. 7 is a structural block diagram of a session establishment apparatus according to an embodiment of the present invention.

FIG. 7 shows a structural block diagram of a session establishment apparatus according to an embodiment of the present invention. The apparatus is located in an L2 session control functional entity, a customer location function set, and an L2 forwarding functional entity in a system structure that is applicable to an L2 session establishment method and is defined by the BBF standards organization in a WT145 standard, and is configured to operate the methods shown in FIG. 1 to FIG. 3 in the present invention correspondingly. To facilitate description, only a part related to this embodiment is described.

Referring to FIG. 7, in the L2 session control functional entity, the apparatus includes:

an IVC acquiring unit 71, acquiring an IVC corresponding to a UE;

a VLAN label sending unit 72, sending a VLAN label corresponding to the IVC to a customer location function set, so that the customer location function set adds the VLAN label to a packet of the UE, where the VLAN label is configured by the L2 session control functional entity for the IVC; and a VLAN label notifying unit 73, notifying the L2 forwarding functional entity of the VLAN label, so that the L2 forwarding functional entity forwards, to the IVC, the packet sent by the customer location function set and added with the VLAN label.

Optionally, the IVC acquiring unit 71 includes:

an authentication request receiving subunit, receiving an authentication request sent by the customer location function set, where the authentication request includes a subscriber identity of the UE;

an access request sending subunit, sending an access request including the subscriber identity to a policy control system; and a first routing policy receiving subunit, receiving a routing policy that is returned by the policy control system according to the subscriber identity, where the routing policy indicates the IVC.

Optionally, the IVC acquiring unit 71 includes:

a second routing policy receiving subunit, receiving a routing policy that is returned by a policy control system, where the routing policy indicates the IVC and a subscriber identity of the UE.

Optionally, the L2 session control functional entity further includes:

a first IVC establishing unit, establishing at least one IVC; and a first configuring unit, configuring a VLAN label for each IVC.

Optionally, the L2 session control functional entity further includes:

a second IVC establishing unit, establishing the IVC; and a second configuring unit, configuring the VLAN label corresponding to the IVC.

In the customer location function set, the apparatus includes:

an authentication request sending unit 74, sending an authentication request including a subscriber identity of a user equipment UE, so that an L2 session control functional entity acquires an infrastructure virtual circuit IVC corresponding to the UE, where the IVC is determined according to the subscriber identity;

a VLAN label adding unit 75, adding a VLAN label to a packet of the UE, where the VLAN label is configured by the L2 session control functional entity for the IVC and sent to the customer location function set; and a packet sending unit 76, sending the packet added with the VLAN label to the L2 session forwarding functional entity, so that the L2 session forwarding functional entity forwards the packet added with the VLAN label to the IVC.

Optionally, the authentication request sending unit 74 is configured to send the authentication request to the L2 session control functional entity.

Optionally, the authentication request sending unit 74 is configured to send the authentication request to a policy control system.

Optionally, the customer location function set is deployed on a residential gateway or a router.

In the L2 session forwarding functional entity, the apparatus includes:

a VLAN label receiving unit 77, receiving a VLAN label that is sent by the L2 session control functional entity and corresponds to an infrastructure virtual circuit IVC, where the IVC is an IVC corresponding to a user equipment UE, and the VLAN label is configured by the L2 session control functional entity for the IVC;
a packet receiving unit 78, receiving a packet sent by the customer location function set and added with the VLAN label; and a packet forwarding unit 79, forwarding the packet to the IVC corresponding to the VLAN label.

In the embodiment of the present invention, an L2 session control functional entity configures a corresponding VLAN label for an IVC, and binds, trough a routing policy, a UE with a VLAN label of an IVC corresponding to the UE, so that an L2 forwarding functional entity can forward, according to the binding relationship, a packet of the UE to the IVC corresponding to the UE, so as to implement dynamic establishment of an L2 session, thereby avoiding a case in which the L2 forwarding functional entity needs to store a large MAC table and improving packet forwarding efficiency.

The foregoing descriptions are merely exemplary embodiments of the present invention, but are not intended to limit the present invention. Any modification, equivalent replacement, and improvement made within the spirit and principle of the present invention shall all fall within the protection scope of the present invention.

What is claimed is:

1. A session establishment method, comprising:
acquiring, by an L2 session control functional entity, an infrastructure virtual circuit (IVC) corresponding to a user equipment (UE);
configuring, by the L2 session control functional entity, a virtual local area network (VLAN) label corresponding to the IVC;
sending, by the L2 session control functional entity, the VLAN label corresponding to the IVC to a customer location function set, wherein the customer location function set adds the VLAN label to a packet of the UE; and
notifying, by the L2 session control functional entity, an L2 forwarding functional entity of the VLAN label, wherein the L2 forwarding functional entity forwards, to the IVC, the packet sent by the customer location function set according to the VLAN label contained in the packet,
wherein the L2 session control functional entity and the L2 session forwarding functional entity are deployed on a same access node,
wherein the acquiring the IVC corresponding to the UE comprises receiving, by the L2 session control functional entity, a routing policy returned by a policy control system, wherein the routing policy indicates the IVC and a subscriber identity of the UE, and
wherein the configuring the VLAN label corresponding to the IVC comprises binding, by the L2 session control functional entity, through the routing policy, the UE with the VLAN label of the IVC corresponding to the UE.

2. The method according to claim 1, wherein the acquiring the IVC corresponding to the UE comprises:
receiving, by the L2 session control functional entity, an authentication request sent by the customer location function set, wherein the authentication request comprises a subscriber identity of the UE; and
sending, by the L2 session control functional entity, an access request comprising the subscriber identity to a policy control system.

3. The method according to claim 1, wherein before the acquiring the IVC corresponding to the UE, the method comprises:
establishing, by the L2 session control functional entity, at least one IVC; and
configuring, by the L2 session control functional entity, a VLAN label for each IVC.

4. The method according to claim 1, wherein after the acquiring the IVC corresponding to the UE and before the sending the VLAN label corresponding to the IVC to the customer location function set, the method comprises establishing, by the L2 session control functional entity, the IVC.

5. The method according to claim 1, wherein the access node comprises an optical line terminal (OLT).

6. A session establishment apparatus comprising a processor and a non-transitory computer readable medium containing computer-executable instructions such that when the instructions are executed by the processor, the apparatus performs the method comprising:
acquiring an infrastructure virtual circuit (IVC) corresponding to a user equipment (UE);
configuring a virtual local area network (VLAN) label corresponding to the IVC;
sending the VLAN label corresponding to the IVC to a customer location function set, wherein the customer location function set adds the VLAN label to a packet of the UE; and
notifying an L2 forwarding functional entity of the VLAN label, wherein the L2 forwarding functional entity forwards, to the IVC, the packet sent by the customer location function set according to the VLAN label contained in the packet,
wherein the L2 forwarding functional entity is deployed on an access node,
wherein the acquiring the IVC corresponding to the UE comprises receiving, by the L2 session control functional entity, a routing policy returned by a policy control system, wherein the routing policy indicates the IVC and a subscriber identity of the UE, and
wherein the configuring the VLAN label corresponding to the IVC comprises binding, by the L2 session control functional entity, through the routing policy, the UE with the VLAN label of the IVC corresponding to the UE.

7. The apparatus according to claim 6, wherein when the instructions are executed by the processor, the apparatus further performs the method comprising:
receiving an authentication request sent by the customer location function set, wherein the authentication request comprises a subscriber identity of the UE;
sending an access request comprising the subscriber identity to a policy control system.

8. The apparatus according to claim 6, wherein when the instructions are executed by the processor, the apparatus further performs the method comprising:
establishing at least one IVC; and
configuring a VLAN label for each IVC.

9. The apparatus according to claim 6, wherein when the instructions are executed by the processor, the apparatus further performs the method comprising establishing the IVC.

10. The apparatus according to claim 6, wherein the access node comprises an optical line terminal (OLT).

11. A session establishment apparatus, comprising a processor and a non-transitory computer readable medium containing computer-executable instructions, such that when the instructions are executed by the processor, the apparatus is caused to:
send an authentication request comprising a subscriber identity of a user equipment (UE), wherein an L2 session control functional entity acquires an infrastructure virtual circuit (IVC) corresponding to the UE, wherein the IVC is determined according to the subscriber identity;

add a VLAN label to a packet of the UE, wherein the VLAN label is configured by the L2 session control functional entity for the IVC and sent to a customer location function set; and send the packet added with the VLAN label to an L2 session forwarding functional entity, so that the L2 session forwarding functional entity forwards the packet to the IVC according to the VLAN label contained in the packet, wherein the L2 session control functional entity and the L2 session forwarding functional entity are deployed on a same access node, wherein when the L2 session control functional entity acquires the IVC corresponding to the UE, the L2 session control functional entity receives a routing policy returned by a policy control system, wherein the routing policy indicates the IVC and a subscriber identity of the UE, and wherein when the L2 session control functional entity configures the VLAN label corresponding to the IVC, the L2 session control functional entity binds, through the routing policy, the UE with the VLAN label of the IVC corresponding to the UE.

12. The apparatus according to claim 11, wherein the apparatus is further caused to send the authentication request to the L2 session control functional entity.

13. The apparatus according to claim 11, wherein the apparatus is further caused to send the authentication request to the policy control system.

14. The apparatus according to claim 11, wherein the customer location function set is deployed on a residential gateway or a router.

15. The apparatus according to claim 11, wherein the access node comprises an optical line terminal (OLT).

* * * * *